United States Patent [19]
Wotton

[11] Patent Number: 6,000,171
[45] Date of Patent: Dec. 14, 1999

[54] METHOD OF HOLDING A PLANT TO A STAKE AND A KIT THEREFOR

[75] Inventor: Michael C. Wotton, Plantsville, Conn.

[73] Assignee: Sun Hill Industries, Inc., Stamford, Conn.

[21] Appl. No.: 09/078,044

[22] Filed: May 13, 1998

[51] Int. Cl.⁶ ............................ A01G 17/10; A01G 17/04
[52] U.S. Cl. ........................................ 47/44; 47/47
[58] Field of Search ............................. 47/44, 47, 42; 446/370, 371, 373

[56] References Cited

U.S. PATENT DOCUMENTS

| | | | |
|---|---|---|---|
| 1,255,446 | 2/1918 | Lofgren | 446/370 |
| 1,890,217 | 12/1932 | Dobbins | 47/44 |
| 4,233,775 | 11/1980 | Neufeld | 446/370 |
| 4,333,264 | 6/1982 | Smrt | 47/42 |
| 5,762,531 | 6/1998 | Witkin | 446/374 |
| 5,848,628 | 12/1998 | Badalamenti | 160/38 |

FOREIGN PATENT DOCUMENTS

| | | | |
|---|---|---|---|
| 120740 | 3/1994 | Sweden | 47/44 L |
| 283830 | 10/1952 | Switzerland | 47/44 L |

Primary Examiner—Thomas Price
Assistant Examiner—Son T. Nguyen
Attorney, Agent, or Firm—David P. Gordon; David S. Jacobson; Thomas A. Gallagher

[57] ABSTRACT

A method of holding plants to a stake is provided. A posable figure preferably having a plurality of elongate positionable appendages is provided. The posable figure preferably has an internal bendable wire frame and external relatively soft body, appendage, and head portions surrounding the wire frame. In addition, the figure is preferably a whimsical figure, such as a fanciful frog, garden bug, or farmer. A stake is inserted into the soil or other ground or potting material adjacent the plant. Then a pair of appendages of the figure are positioned on either side of the plant stem and stake and bent about the plant stem and the stake. The process is preferably repeated for additional appendages. The method provides a quick, easy, and decorative manner for safely holding a plant to a stake. A kit of posable figures is also provided for practicing the method of the invention. In addition, a method is provided for using bendable plant ties having a non-figure-like form to safely and securely tie a plant to a stake, and a kit of such bendable plant ties is also provided.

13 Claims, 11 Drawing Sheets

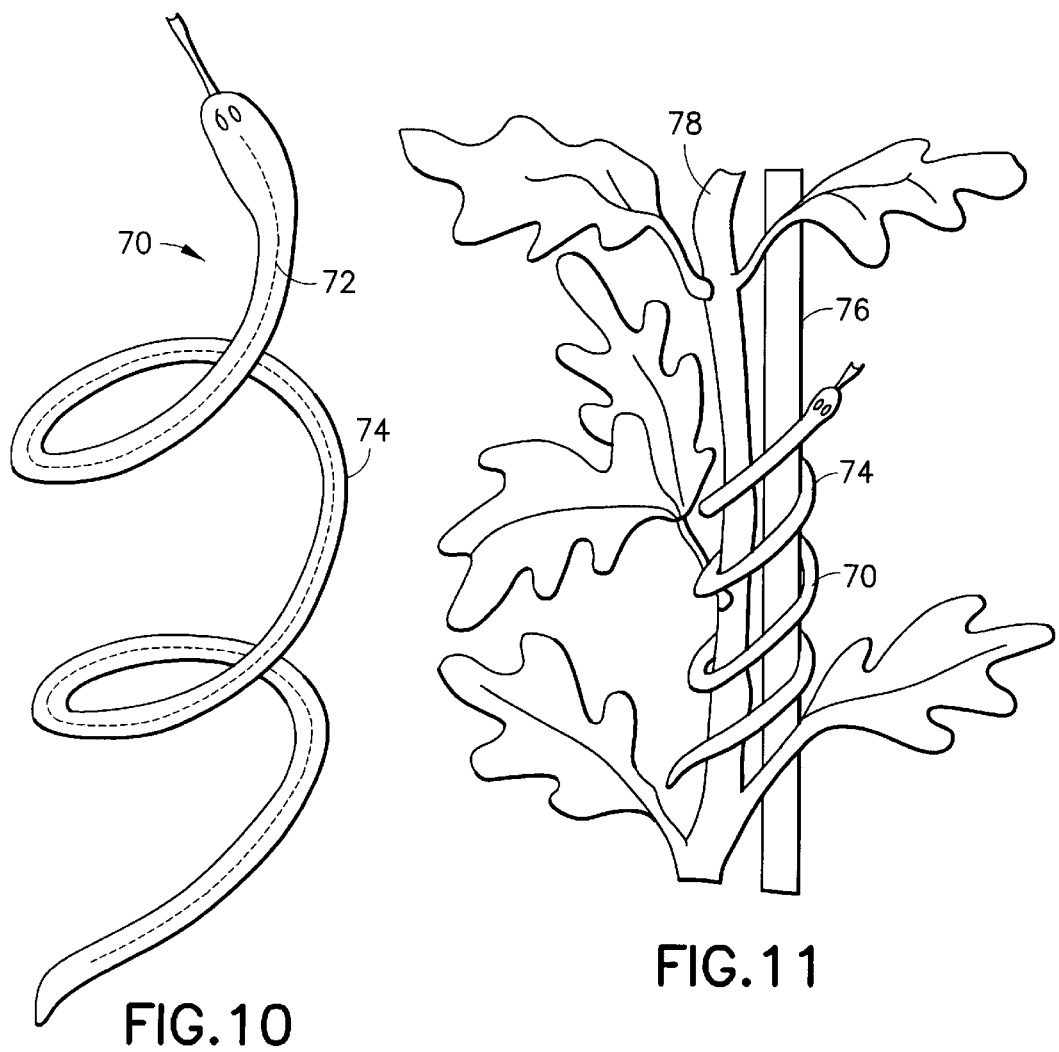

METHOD OF HOLDING A PLANT TO A STAKE AND A KIT THEREFOR

BACKGROUND OF THE INVENTION

1. Field of the Invention

This invention relates broadly to a method of supporting plants. More particularly, this invention relates to a method holding plants to support stakes.

2. State of the Art

Fruit bearing plants are often staked to prevent the plants, when heavy with fruit, from breaking or falling over toward the ground. If the plants break, the fruit will not properly develop. If the plants fall over, the fruit will touch the ground and will rot. In addition, other types of plants are staked to assist the plants in growing vertically or in another desired direction.

In order to stake a plant, a plant stake is inserted into the soil adjacent the plant and a tie is used to couple the plant to the stake. Typically, a plant tie is a piece of string or a common twist tie (a piece of wire sandwiched between thin pieces of plastic or paper). Tying a plant to a stake with one or more ties is generally a cumbersome process. It is difficult to hold the stem of the plant (which has a tendency to fall away from the stake) against the stake while the plant tie is secured around the stem and the stake. At times, especially when using a string to tie a plant to a stake, the two hands of the gardener can seem inadequate to hold the plant stem adjacent the stake while securing the tie thereabout. Also, the relatively small width of a string or twist tie when tightly tied or twisted against the plant stem can cause injury to the plant. Furthermore, when using only a single tie along the stem of a plant, it will be appreciated that the string or twist tie only contacts the stem at a single location. Therefore, the plant is not stably held against the stake and may droop above the location of the tie or bow below the location of the tie. This is especially common with weak-stemmed plants such as tomato plants. Moreover, as the plant grows, it is often necessary to provide plant ties along the stem at a different location; the existing plant ties must be removed and discarded (creating waste), and the entire process of tying the plant to the stake must be repeated. In addition, conventional plant ties are unsightly and detract from the appearance of the garden or plant pot in which they are used.

SUMMARY OF THE INVENTION

It is therefore an object of the invention to provide a method of holding plants to a stake which results in the tied plant having a decorative appearance.

It is another object of the invention to provide a method of holding plants to a stake which can easily be done by one person in an expedient manner.

It is a further object of the invention to provide a method of holding plants which permits relatively simple relocation of the plant ties along the stem of the plant.

It is yet another object of the invention to provide a method for stably holding a plant to stake.

In accord with these objects, which will be discussed in detail below, embodiments of methods of holding plants to a stake are provided. In accord with a first preferred embodiment, first, a posable figure (i.e., a figure capable of being posed) preferably having a plurality of elongate positionable appendages is provided. The posable figure preferably has an internal bendable wire frame and external relatively soft body, appendage, and head portions surrounding the wire frame. In addition, the figure is preferably a whimsical figure, such as a fanciful frog, garden bug, or farmer. A stake is inserted into the soil or other ground or potting material adjacent the plant. Then a pair of appendages of the figure are positioned on either side of the plant stem and stake and bent (folded or wrapped or twisted) about the plant stem and the stake. The process is preferably repeated for additional appendages.

According to another less preferred embodiment, the posable figure is not provided with pairs of appendages. For example, the figure may be a snake. It will be appreciated that the body may be wrapped about the plant stem and the stake to securely hold the plant to the stake.

According to yet another less preferred embodiment, a non-figure-like plant tie consisting of a brace portion and a plurality of arms is used to support the plant stem to the stake. The arms are bent about the plant stem such that they contact the plant stem in more than one vertically displaced horizontal plane.

It will be appreciated that the method of holding plants to a stake according to the invention provides a quick, easy, and decorative manner for safely holding a plant to a stake.

Additional objects and advantages of the invention will become apparent to those skilled in the art upon reference to the detailed description taken in conjunction with the provided figures.

BRIEF DESCRIPTION OF THE DRAWINGS

FIGS. 10 and 11 illustrate a second embodiment of the invention;

DETAILED DESCRIPTION OF THE PREFERRED EMBODIMENTS

Figure 1:
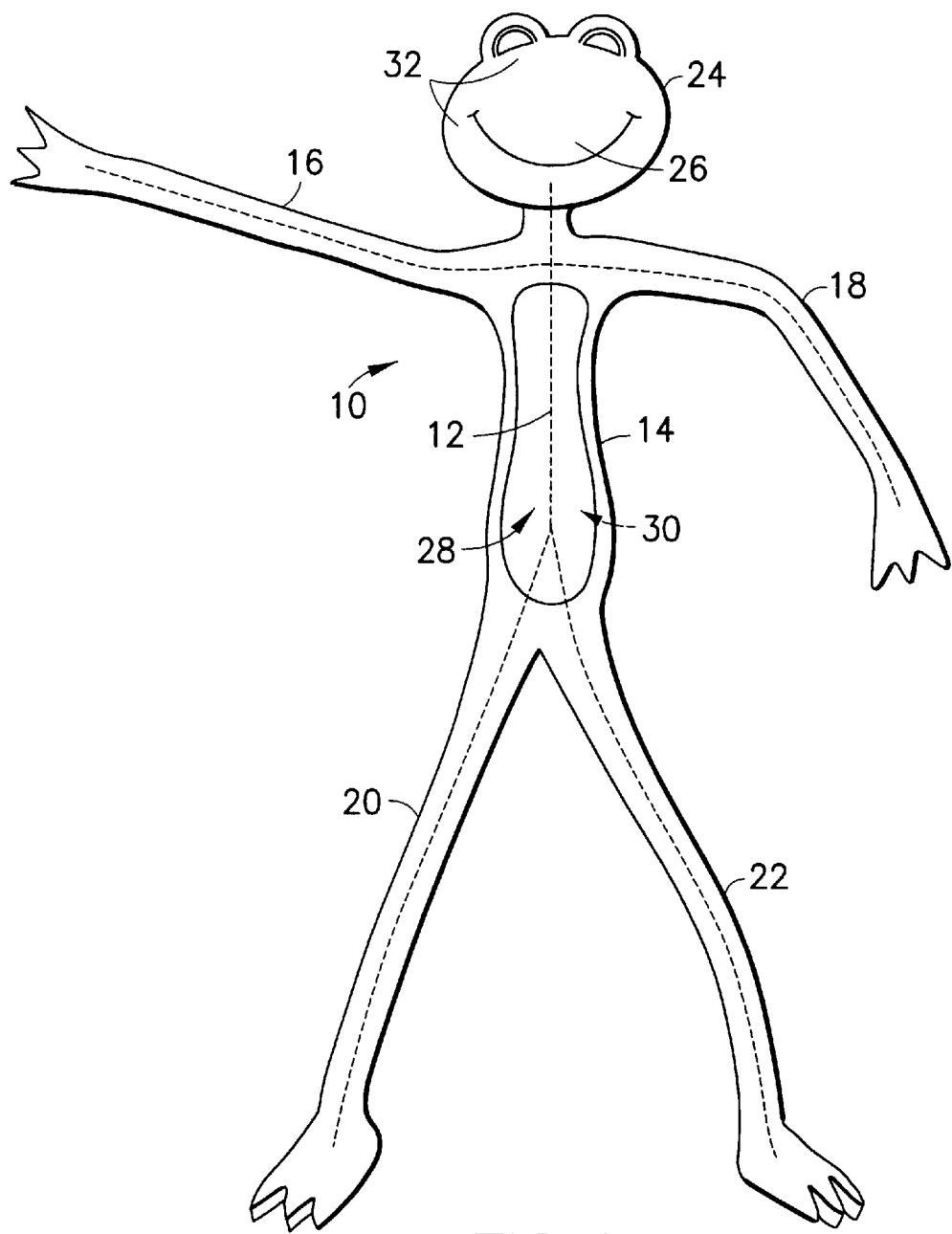
FIG. 1 shows one preferred posable figure for use in the preferred method of the invention.

Turning now to FIG. 1, a preferred posable FIG. 10 for use in the method of the invention is shown. The posable FIG. 10 includes external relatively soft body portions, i.e., torso 14, appendages including arms 16, 18 and legs 20, 22, and a head 24 preferably provided with a face, all of which preferably surround an internal bendable wire frame 12 (shown by dashes). The FIG. 10 includes a front 28 and a back 30. Indicia 32 may also be provided on one or more of the body portions, e.g, facial features on the face of the figure. Together the body portions and face preferably define a fanciful character, such as the frog shown in FIG. 1. The body portions are preferably made from a PVC or another preferably soft synthetic material. Exemplar dimensions for the posable figure include an approximately five inch total height, an approximately six inch arm span, and arms and legs each approximately two and a half inches in length, though it will be appreciated that the posable figure may be otherwise sized.

Figure 2:
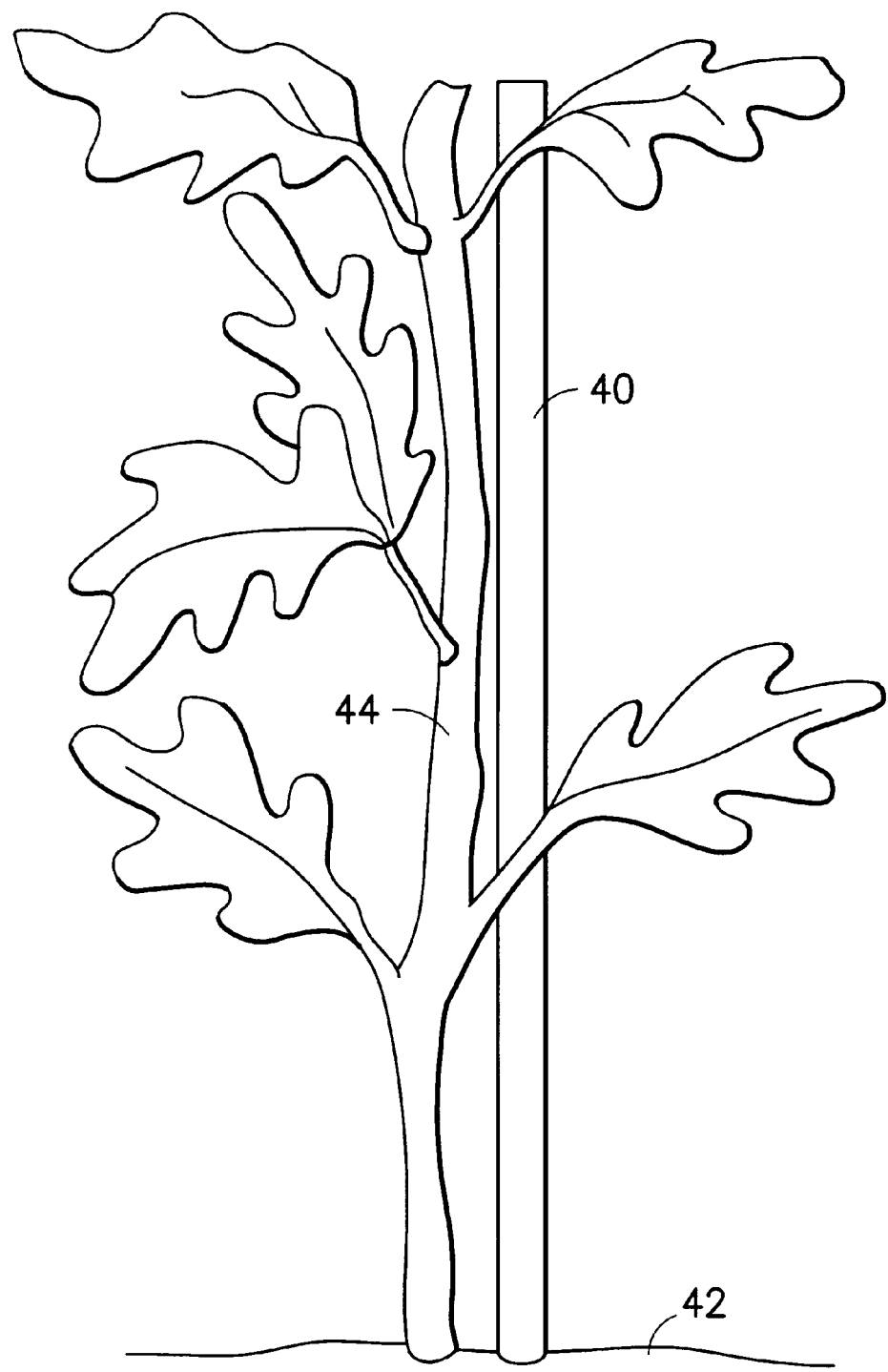
FIGS. 2 through 5 illustrate the preferred method of the invention.
Figure 3:
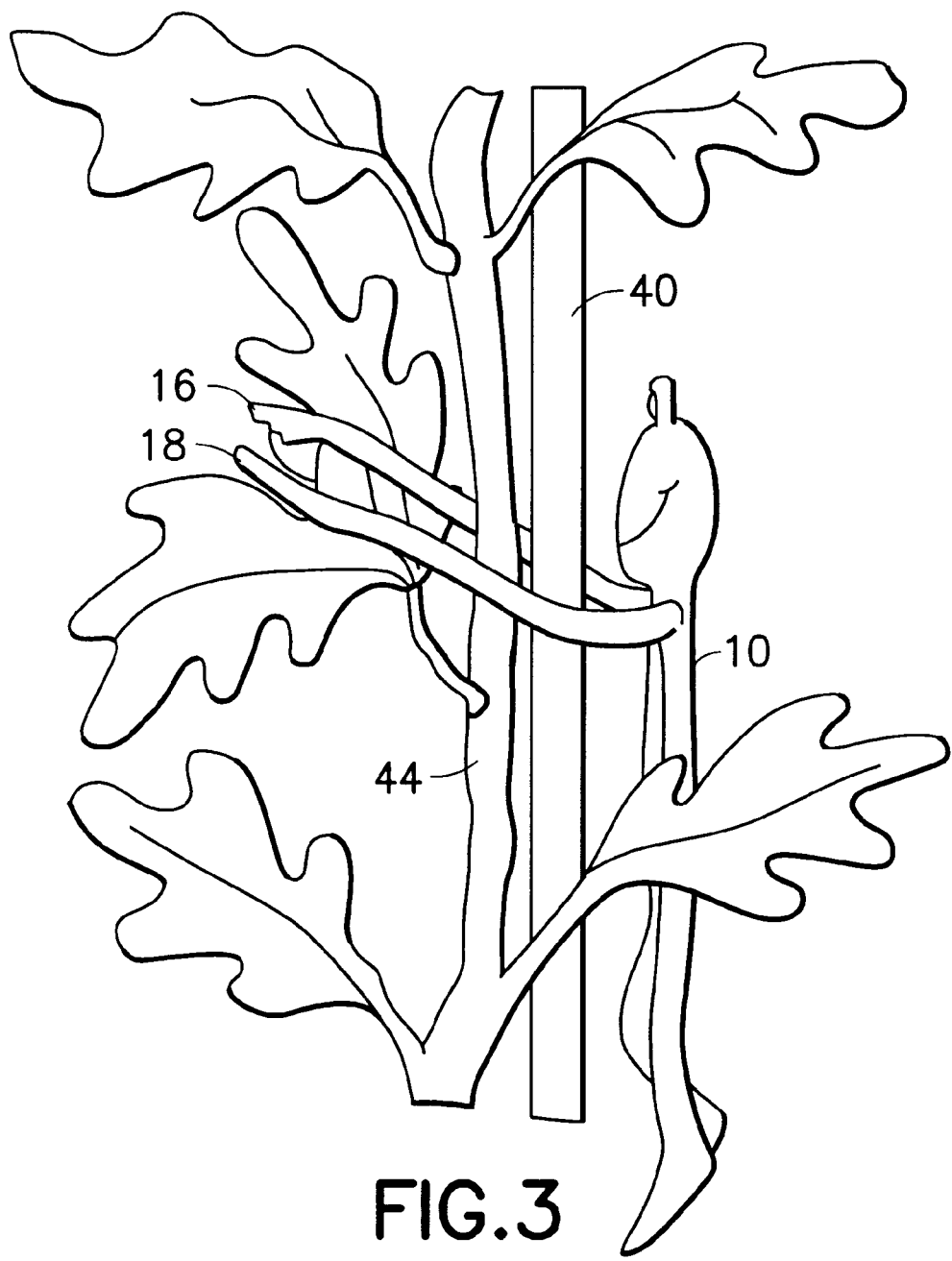
Figure 4:
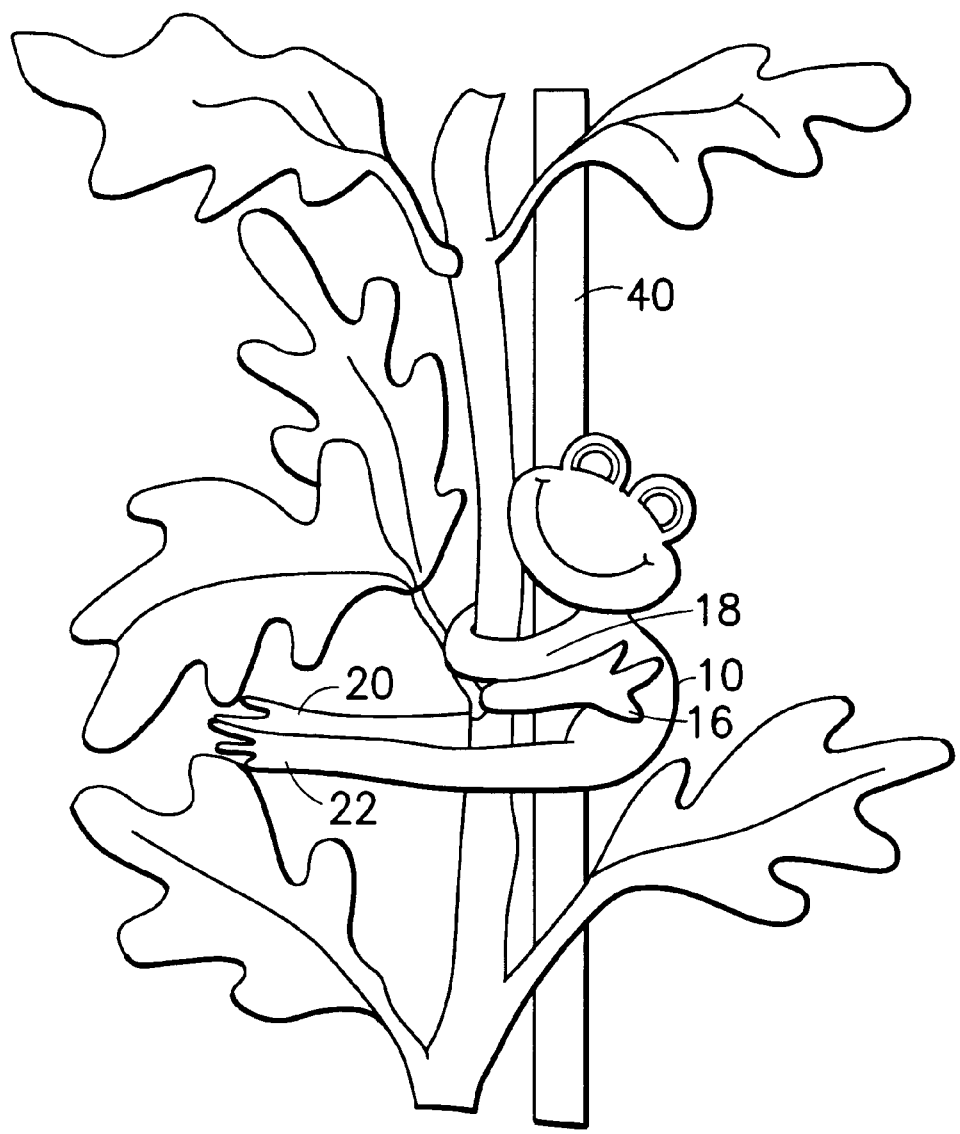
Figure 5:
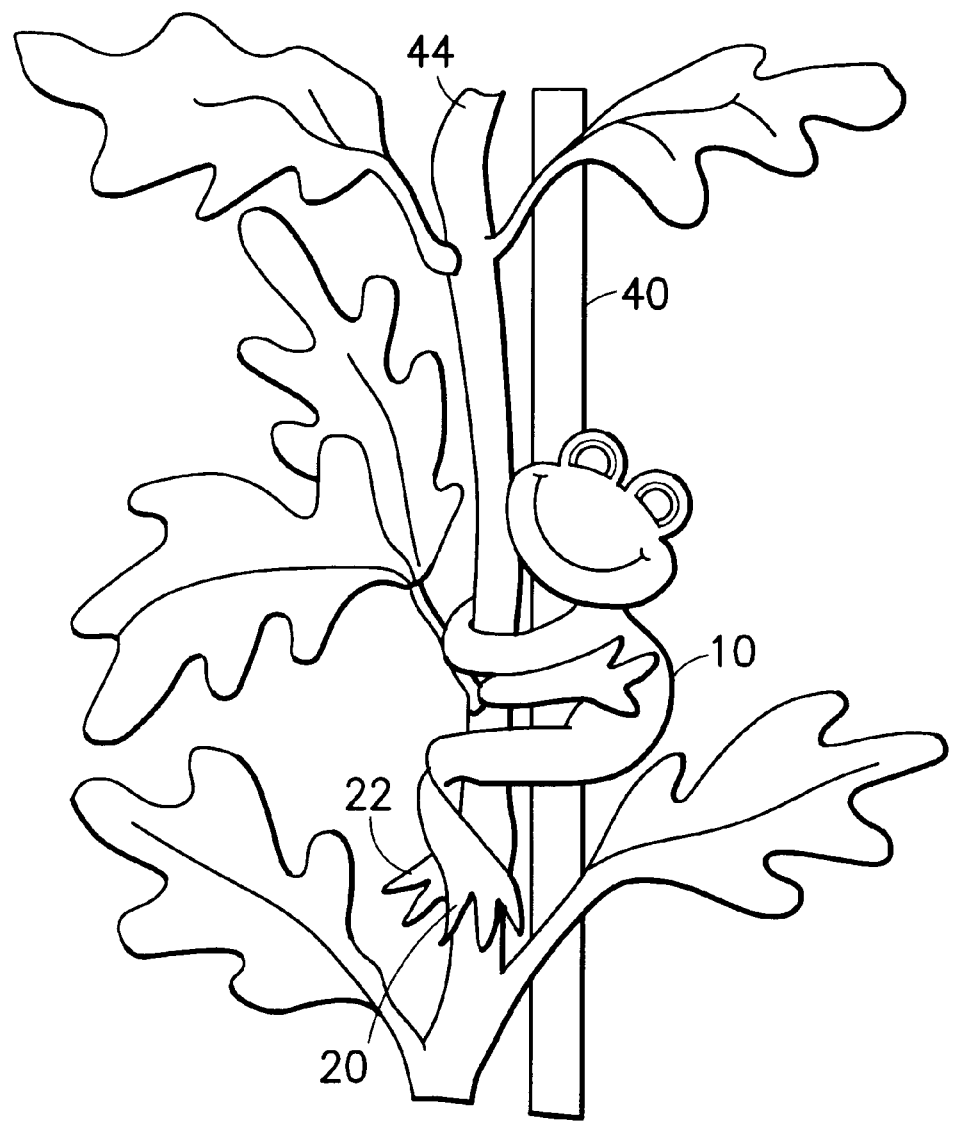

Turning now to FIGS. 2 through 5, the method the invention will now be described. A stake 40 is inserted into the soil 42 or other ground or potting material adjacent the plant stem 44 (FIG. 2). The FIG. 10 is then provided adjacent the stake and stem, preferably with the figure located upright (the head of the figure on top), and the head 24 of the figure generally facing the stake. A pair of appendages, e.g., arms 16, 18, of the FIG. 10 are positioned on either side of the stake 40 and plant stem 44 (FIG. 3) and bent (folded or wrapped or twisted) about the stake and the plant stem (FIG. 4). The process is preferably repeated for a second pair of appendages, e.g., legs 20, 22; that is, the legs are positioned on either side of the stake 40 and plant stem 44 (FIG. 4) and then bent about the stake and plant stem (FIG. 5).

It will be appreciated that the method of invention for holding plants to a stake is easy to perform with two hands and quickly carried out. In addition, unlike string ties and twist ties, if necessary the figure may easily be removed from about the stake and plant. Furthermore, it is easy to relocate the plant tie to a different location along the stem of the plant. Moreover, the soft body portions do not injure the plant when held thereagainst and, in fact, provide the plant with a cushion-like protection that other plant ties cannot provide. Also, because the arm appendages are located in a separate vertical plane from leg appendages, contact between the plant tie and the plant and stake occurs at two locations which are each in a separate vertical plane and which thereby assists in supporting the plant and to preventing the plant from bowing below or drooping above the plant tie.

Figure 6:
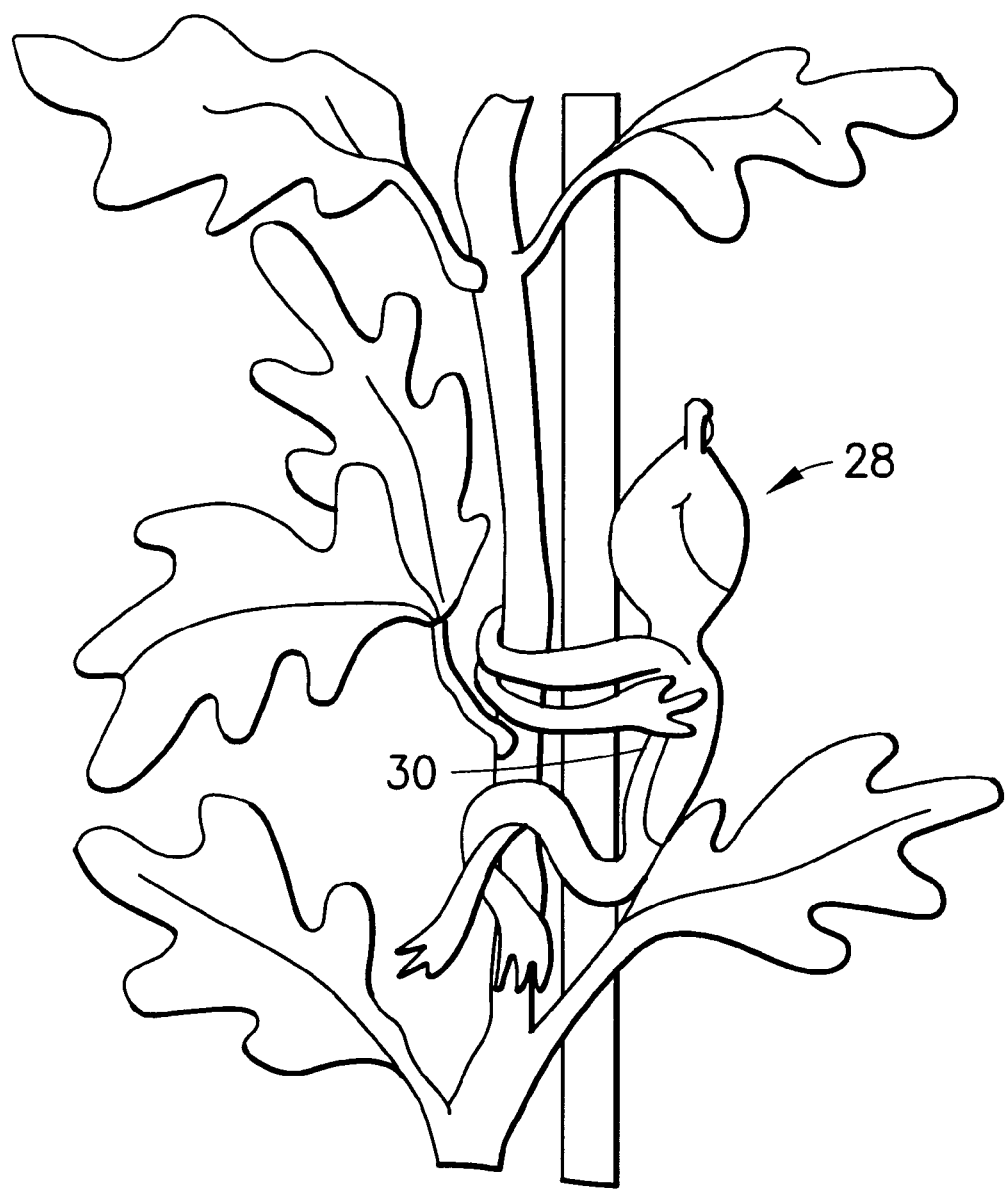
FIG. 6 illustrates an alternative manner according to the preferred method of the invention for mounting the posable figure.

Referring now to FIG. 6, according to an alternate method of the invention, the figure is positioned adjacent the stake 40 and plant stem 44 with its back 30 toward the stake and plant stem, and consequently with its front 28 facing away from the stake and stem. Accordingly, the face and torso 14 can be oriented such that their features are unobstructed by the stake and plant stem and can be better viewed as a decorative item.

Figure 7:
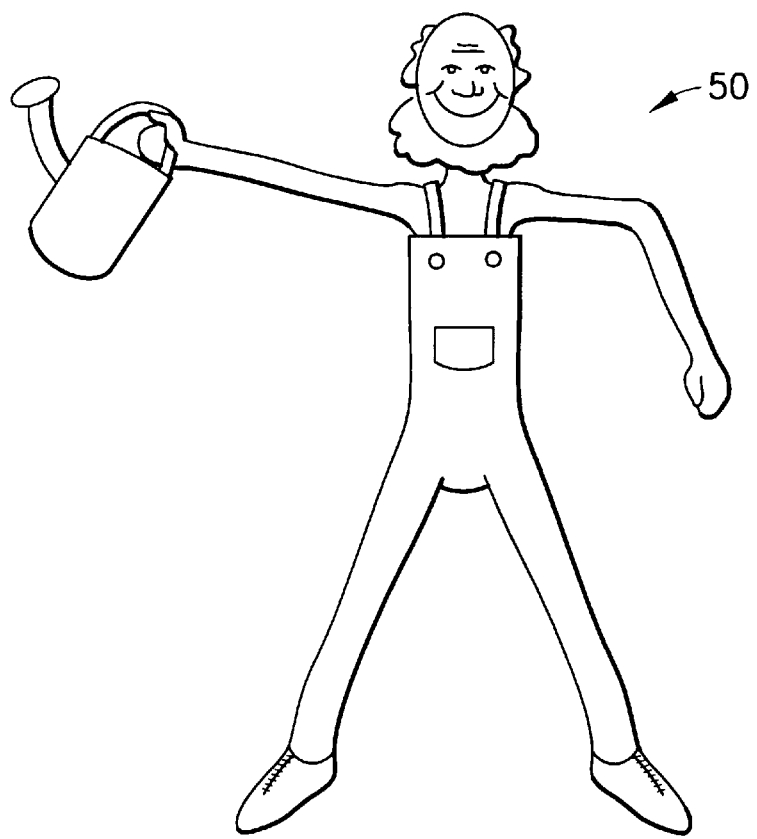
FIGS. 7 through 9 illustrate exemplar alternative posable figures for use in the preferred method of the invention.
Figure 9:
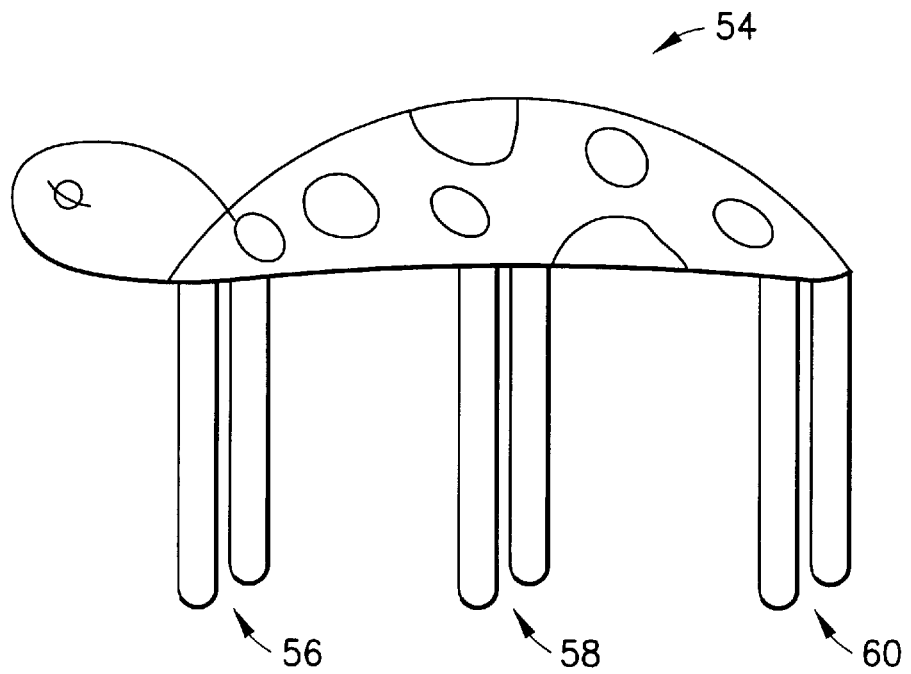
Figure 8:
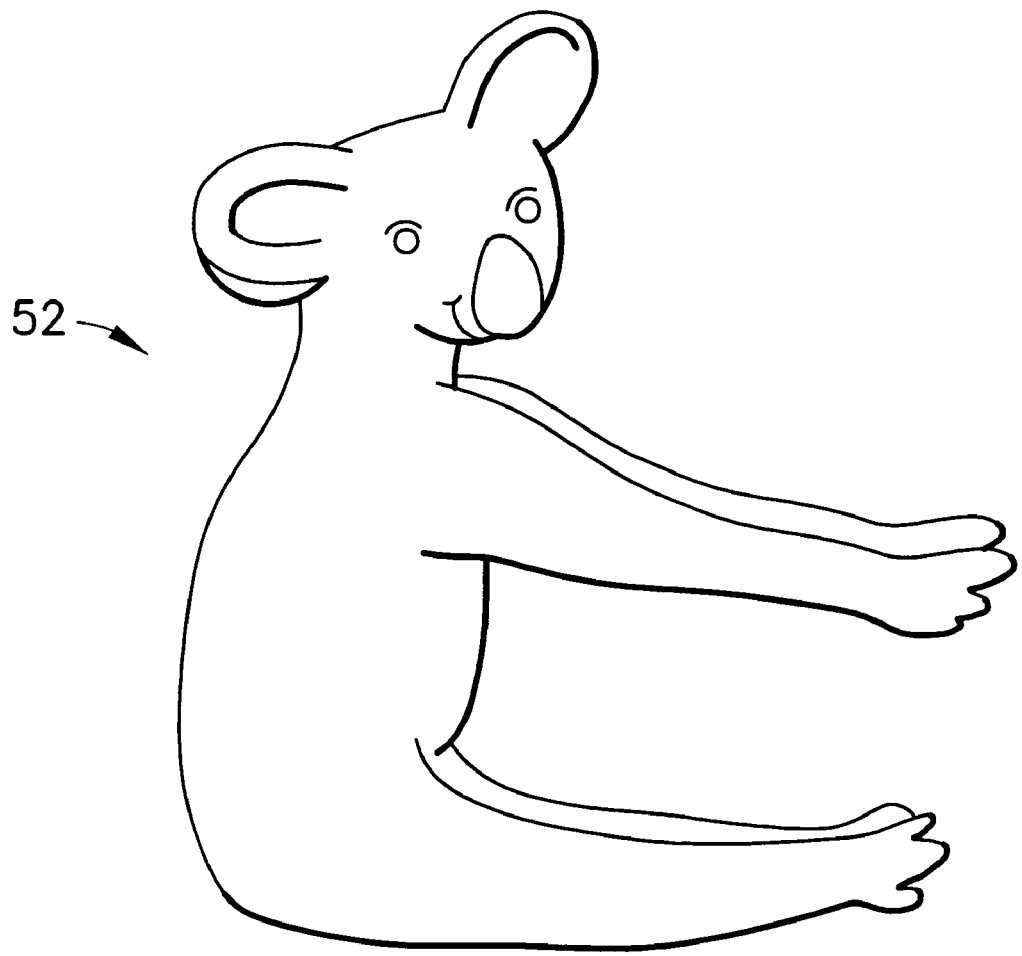

It will further be appreciated that posable figures in the form of a whimsical character other than a frog may also be used in the method. For example, referring to FIG. 7, the posable figure may be in the form of a farmer 50. The posable figure may be in the form of a koala bear 52 (FIG. 8) or other tree or plant dwelling animal, e.g, a bird or lizard. Moreover, insects, such as a ladybug 54 (FIG. 9) or spiders may also be used. With respect to the ladybug 54 of FIG. 9, it will be appreciated that three pairs 56, 58, 60 of legs (or even more than three pairs) may be wrapped about the stake and stem. Of course, other figures can also be used and the above recitation is not intended to be limiting.

Turning now to 10, and according to a second and less preferred embodiment of the invention, a serpentine posable Figure 70 is provided for use as a plant tie. The figure is preferably constructed in a similar manner to the posable FIG. 10 shown in FIG. 1; i.e., with an internal wire frame 72 surrounded by a relatively soft outer body 74. The wire frame may be predisposed into a coiled configuration or may be bendable into a coil. Referring to FIG. 11, a stake 76 is inserted into the soil or other ground or potting material adjacent the plant stem 78 and the body 74 of the serpentine Figure 70 is then wrapped around the stake and stem, preferably in a coil or other serpentine manner, until the figure holds the plant stem relative to the stake.

Figure 12:
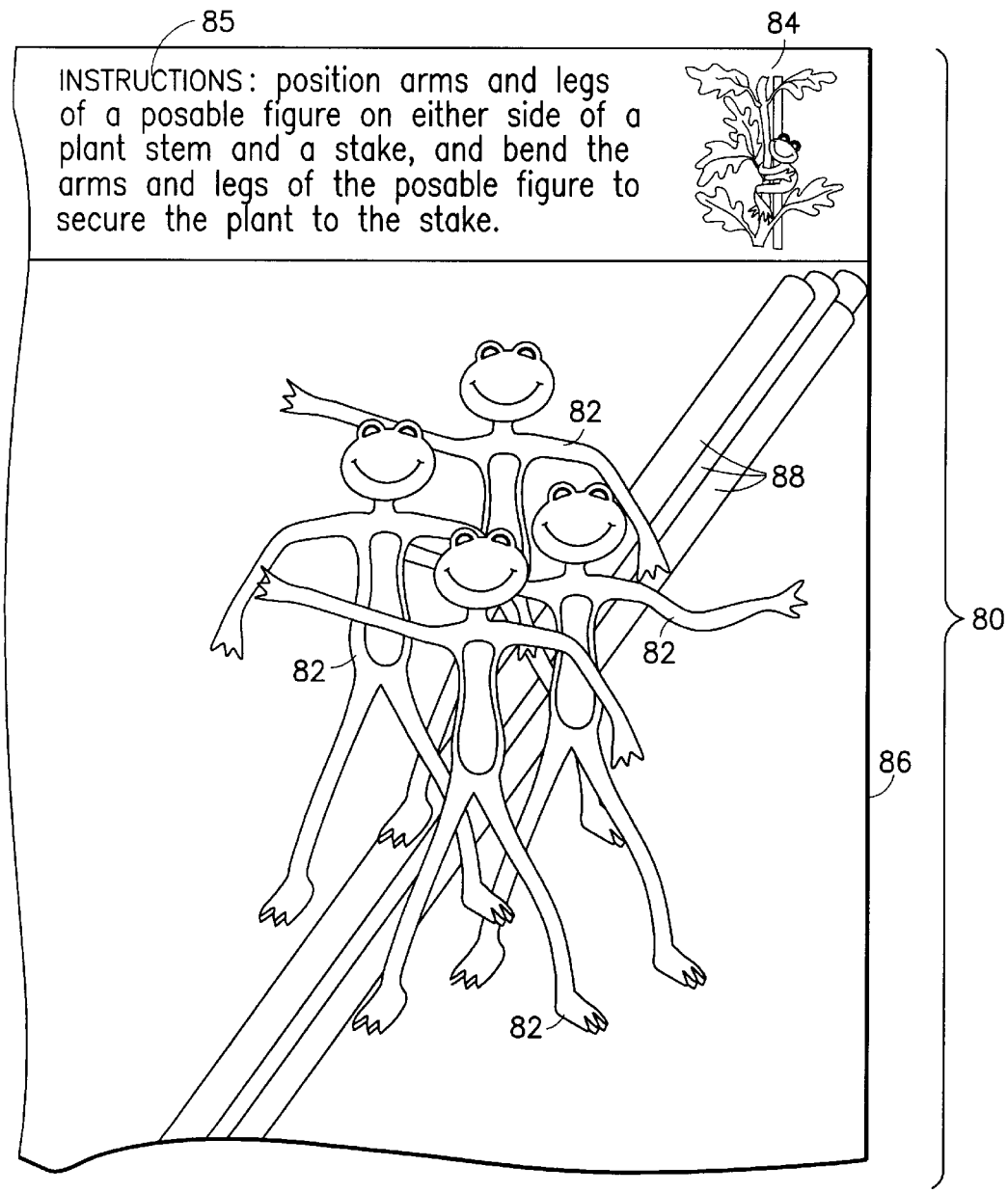
FIG. 12 is a broken illustration of a kit according to the invention.

Referring now to FIG. 12, it will also be appreciated that the posable figures may be sold as kit 80 for use in holding plants. The kit includes a plurality of posable Figure 82, printed pictorial 84 and/or textual instructions 85 which provide the gist for using the posable figures substantially in accordance with the method of the invention, described above (e.g., one picture 84 showing the posable figure being used to hold a plant stem to a stake, or a brief instruction for the use of the posable figures), and packaging 86 permitting a purchaser of the kit to discern the posable figures within the packaging (either by printing thereon, or by manufacturing the packaging from a substantially clear packaging material. The kit may also include plant stakes 88, which are included within the packaging 86. The posable figures within the kit may be of like kind (i.e., each posable figure is substantially the same as the others) or the kit may be provided with a variety of posable figures (i.e., several different posable figures, for example those described above in FIGS. 1, 7, 8, 9, and 10) may be provided.

Figure 13:
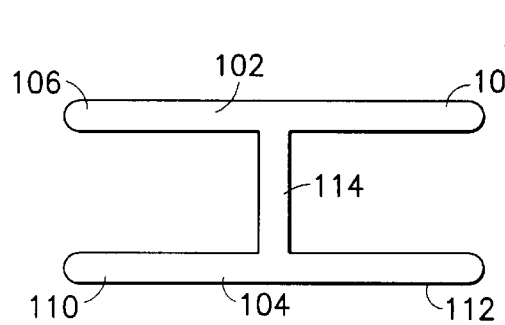
FIGS. 13 through 15 illustrate alternatives plant ties to the posable figures for use in the method of the invention.
Figure 15:
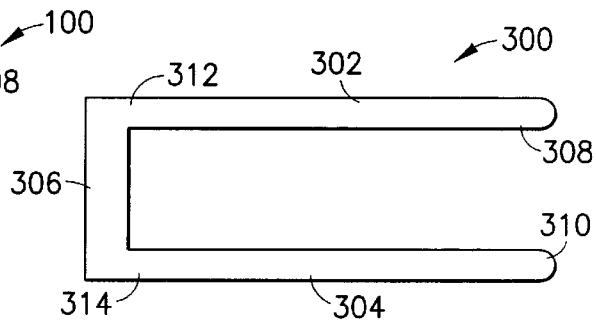
Figure 14:
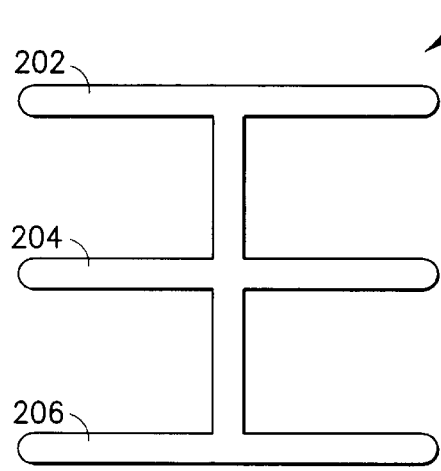

Turning now to FIGS. 13 through 15 less preferred, non-figure-like plant ties are provided. With respect to FIG. 13, the plant tie 100 consists of two pairs 102, 104 of bendable arms 106, 108, 110, 112, and an integral brace portion 114 extending substantially transversely across the pairs 102, 104 of arms; i.e., when the brace is vertically oriented, each pair of arms is vertically displaced relative to the other. In other words, the plant tie has an 'I' or rotated 'H' shape. The plant ties are preferably formed from a wire frame surrounded by a soft synthetic material, as described above with respect to the posable figure plant ties. Referring to FIG. 14, a similar plant tie 200 is shown, including three pairs 202, 204, 206 of arms. Likewise, it will be appreciated that more than three pairs of arms may be used. Turning to FIG. 15, it will also be appreciated that a plant tie 300 having two arms 302, 304 and a brace portion 306, the arms each having one free end 308, 310 and another end 312, 314 which is joined to the brace portion 306 may be provided; i.e., the plant tie can be of a generally 'C' or rotated 'U' shape. It will be appreciated that more than two arms can also be joined by the brace portion.

Figure 16:
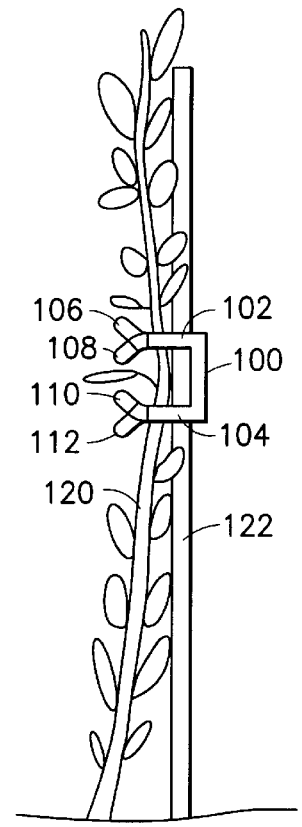
FIG. 16 illustrates a third embodiment of the invention.

Referring now to FIG. 16, the plant tie 200 (FIG. 13) can be positioned with each of its arms 106, 108, 110, 112 about the plant stem 120 and stake 122 such that each pair 102, 104 of the vertically-displaced arms is provided in a different horizontal plane than others of pair of arms. The arms 106, 108, 110, 112 are then bent about the plant stem 120 and the stake 122 such that the arms hold the plant stem to the stake. The method of tying plants provides contact between the plant tie 100, the plant 120, and the stake 122 at at least two locations which are vertically displaced. In a similar method of plant tying, a plant tie having its arms coupled at the ends by a brace portion (e.g., FIG. 15) can be used. The brace portion is positioned adjacent the stake, and the arms are bent substantially completely around the plant stem and stake and back to the brace portion where they are bent or twisted to enclose the plant stem and stake with the same benefit described above.

It will be appreciated that a kit, substantially similar to the kit described above with respect to FIG. 12, can be provided which, rather than including posable figure plant ties, instead includes the plant ties described with respect to FIGS. 13 through 15, and their equivalents.

There have been described and illustrated herein several embodiments of a method for holding a plant stem to a stake and a kit. While particular embodiments of the method of the invention have been described, it is not intended that the invention be limited thereto, as it is intended that the invention be as broad in scope as the art will allow and that the specification be read likewise. Thus, while particular posable figures have been disclosed, it will be appreciated that other figures can be used as well. In addition, while the posable figures are preferably whimsical characters, it will be appreciated that the figures may be realistic. For example, posable figures may be provided which have the appearance of living insects and serpents. Furthermore while particular materials for the posable figure have been disclosed, it will be understood that the posable figure may be manufactured from other materials, provided the figure may be bent into a desired position (pose) and maintained in that position. Moreover, one exemplar dimensions have been provided for a posable figure, it will be appreciated that posable figure may be provided in other dimensions, provided that a pair of appendages of the figure are bendable about a plant stem and a stake. It will therefore be appreciated by those skilled in the art that yet other modifications could be made to the provided invention without deviating from its spirit and scope as so claimed.

What is claimed is:

1. A method of holding a plant stem of a plant to a stake, the plant being planted in soil or other ground or potting material, comprising:
   a) providing a posable figure in the form of a human-like character or animal-like character, said posable figure having a plurality of elongate positionable appendages;
   b) inserting a stake into the soil or other ground or potting material adjacent the plant;
   c) positioning a pair of appendages of the figure, one appendage of the pair on either side of the plant stem and stake; and
   d) bending the pair of appendages about the plant stem and the stake to hold the plant stem to the stake.

2. A method according to claim 1, further comprising:
   e) repeating c) and d) for additional pairs of appendages.

3. A method according to claim 1, wherein:
   the posable figure has a bendable wire frame and a relatively soft material surrounding said wire frame.

4. A method according to claim 3, wherein:
   the relatively soft material forms body, appendage, and head portions of the posable figure.

5. A method according to claim 1, wherein:
   said posable figure is in the form of a whimsical character.

6. A method according to claim 5, wherein:
   said whimsical character is one of a frog, an insect, a farmer, and a koala bear.

7. A method of holding a plant stem of a plant to a stake, the plant being planted in soil or other ground or potting material and the stake being inserted in the soil or other ground or potting material adjacent the plant, comprising:
   a) providing adjacent the stake and the plant stem a posable figure in the form of a human-like character or animal-like character, said posable figure having a plurality of elongate positionable appendages;
   b) positioning a pair of appendages of the figure, one appendage of the pair on either side of the plant stem and stake; and
   c) bending the pair of appendages about the plant stem and the stake to hold the plant stem to the stake.

8. A method according to claim 7, further comprising:
   d) repeating b) and c) for additional pairs of appendages.

9. A method according to claim 7, wherein:
   the posable figure has a bendable wire frame and a relatively soft material surrounding the wire frame.

10. A method according to claim 9, wherein:
    the relatively soft material form body, appendage, and head portions of the posable figure.

11. A method according to claim 7, wherein:
    said posable figure is in the form of a whimsical character.

12. A method according to claim 11, wherein:
    said whimsical character is one of a frog, an insect, a farmer, and a koala bear.

13. A method of holding a plant stem of a plant to a stake, the plant being planted in soil or other ground or potting material and the stake being inserted in the soil or other ground or potting material adjacent the plant, comprising:
    a) providing adjacent the stake and the plant stem a posable figure in a form of a whimsical serpentine animal, said figure comprising a body portion and a head portion with eyes; and
    b) bending the body portion about the plant stem and stake to hold the plant stem to the stake and further such that the serpentine figure has the appearance of being wound in a serpentine manner about the plant stem and the stake.

* * * * *